3,542,829
PREPARATION OF BROMOMETHYLSILANES
William J. Owen, Penarth, Glamorgan, Wales, assignor to Midland Silicones Limited, Reading, Berkshire, England
No Drawing. Filed July 30, 1968, Ser. No. 748,612
Claims priority, application Great Britain, Aug. 1, 1967, 35,215/67
Int. Cl. C07f 7/08
U.S. Cl. 260—448.2                                6 Claims

ABSTRACT OF THE DISCLOSURE

Di-, tri- and tetra-bromomethylorganosilanes are prepared by reacting appropriate alkoxy or aralkoxysilanes with a triorganophosphine dibromide. The silanes are useful as herbicides and as precursors for organopolysiloxanes.

---

The present invention relates to the preparation of bromomethylorganosilanes and is particularly concerned with the preparation of silanes containing more than one bromomethyl group.

Silanes containing at least one aryl substituent and at least two bromomethyl substituents have not been previously prepared because bromination of methylsilanes leads to continued preferential bromination of the first methyl group attacked. An alternative route using diazomethane has been found incapable of providing good yields of bromomethylsilane and the reagent is dangerous to handle. The lack of a ready source of di-, tri- or tetra-bromomethylsilanes has hindered the development of methylene-containing organosilicon polymers.

In order to prepare chloromethylsilanes, it was proposed in British Patent No. 971,569 to react on alkoxymethylsilane $R_{(4-n)}Si(CH_2OR')_3$ with acetyl chloride in the presence of zinc chloride. This reaction has been found difficult to control to give high or consistent yields due to competition between the acyl groups and the halogen atoms giving rise to a mixture of halomethyl and acetoxymethyl substituted silanes. Moreover, where R is an aryl group the acetyl chloride splits the aryl-Si bond.

We have now discovered a convenient method of preparing bromomethyl(aryl)silanes in satisfactory yields which comprises reacting an alkoxymethyl(aryl)silane with a triorganophosphine dibromide.

Our invention, therefore, provides novel bromomethylsilanes having at least two bromomethyl substituents, and at least one aryl substituent, any other substituent being selected from hydrocarbon, halogenated hydrocarbon or organosiloxyl groups.

According to a further embodiment, our invention provides a method of preparing bromomethyl(aryl)silanes which comprises reacting a silane having at least two alkoxymethyl or aryloxymethyl groups and at least one aryl group, any other substituent being selected from hydrocarbon, halogenated hydrocarbon or organosilyl groups with a triorganophosphine dibromide $Q_3PBr_2$ where each Q is a hydrocarbon group.

The hydrocarbon group may be for example methyl, ethyl, isopropyl, n-butyl, tertiarybutyl, hexyl, cyclohexyl, octyl, lauryl or octadecyl; an aralkyl group such as phenylethyl, an alkenyl group such as vinyl allyl or cyclohexenyl, or an aryl group such as phenyl, naphthyl or xylyl. The halogenated hydrocarbon group may be for example chloromethyl, bromomethyl, $\beta,\gamma$-dibromopropyl, trifluoropropyl or p-chlorophenyl. The organosiloxyl group may be for example trimethylsiloxy or an organosiloxane polymer such as $(CH_3)_3SiO[(CH_3)_2O]_x$ where $x$ is greater than 1.

Preferably, $Q_3PBr_2$ is a triaryl or alkaryl phosphorane, e.g. Q=phenyl, tolyl or xylyl, but it may also be a trialkyl, trialkenyl or triaralkyl compound or, for example, as mixed alkyl-aryl compound.

In particular, Q can be, for example, phenyl, tolyl, xylyl, naphthyl, methyl, ethyl, propyl, isopropyl, n-butyl, tertiary butyl, cyclohexyl, n-octyl, lauryl, cetyl, vinyl or allyl. R' can be, for example, methyl, ethyl, propyl, tertiary butyl, cyclohexyl, n-octyl, lauryl or cetyl. The modified process of our invention is of particular value where at least one group attached to the silane is an aryl group, e.g. for the conversion of phenyltris(methoxymethyl) silane to phenyltris(bromomethyl)silane.

The preferred $Q_3PBr_2$ is triphenyldibromophosphorane. Conveniently, the triorganophosphine dibromide is formed by adding bromine to a solution of trihydrocarbonphosphine. Suitable solvents include benzene, toluene, xylene, chlorobenzene and acetonitrile. It is not necessary to separate the triorganophosphine bromide, the alkoxymethylsilane may be added directly to the solution. Preferably the solution is then heated under reflux until the reaction is complete (for example, 1 to 3 hours is usually adequate). The halomethylsilane may then be recovered, e.g. by fractionation under reduced pressure.

The products of our invention can be used as herbicides and in the preparation of silane and siloxane polymers which are valuable as lubricants, insulators, resins and elastomers.

The invention is illustrated by the following example.

REACTION OF METHYL(PHENYL)BIS(METHOXYMETHYL)SILANE WITH TRIPHENYLDIBROMOPHOSPHORANE

Bromine (32 g. 0.4 g.-atom) was reacted under dry argon with triphenylphosphine (52.4 g. 0.2 mole) in chlorobenzene (300 ml.). Methyl(phenyl)bis(methoxymethyl)silane (33.2 g. 0.2 mole) was then added and the mixture was stirred and heated under reflux (130° C.) for two hours. Vigorous evolution of methylbromide was observed initially and until the reaction mixture became transparent—as the phosphorane (in suspension) was consumed. The mixture was subsequently fractionated through a 2 ft. spinning band column to yield methyl (phenyl)bis(methoxymethyl)silane (8 g. 24.1 percent), unreacted. 1-bromo, 2-methyl, 3-methoxy, 2-phenyl, 2-silapropane (11 g. 27 percent), B.P. 88° (0.8 mm.), $N^{25}$, 1.5338. (Found (percent): C, 46.2; H, 6.15; Br, 32.2; $C_{10}H_{15}BrOSi$. Calc'd (percent): C, 46.3; H, 5.79; Br, 30.9).

The I.R. spectrum (liquid film) showed bands at 3075 (v.w.), 3050 (w.), 2975 (w.), 2925 (w.), 2898 (w.), 2850 (w.), 2812 (m.), 1590 (v.w.), 1463 (w.), 1445 (w.), 1430 (m.), 1420 (s.w.), 1382 (w.), 1253 (m.), 1114 (s.m.), 1105 (s.), 930 (w.), 830 (s.), 810 (m.), 795 (s.l.), 786 (m.), 767 (w.), 732 (m.), 698 (s.), 662 (w.) cm.$^{-1}$.

Methyl(phenyl)bis(bromomethyl)silane, (15 g. 29 percent), B.P. 109 (0.8 mm.), $N^{25}$, 1.5797. (Found (percent): C, 35.1; H, 3.98; Si, 9.32; Br, 52.6, $C_9H_{12}Br_2Si$. Calc'd (percent): C, 35.1; H, 3.90; Si, 9.13; Br, 51.9).

The I.R. spectrum (liquid film) showed bands at 3070 (w.), 3047 (v.w.), 3000 (v.w.), 2960 (v.w.), 2940 (w.), 1591 (v.w.), 1487 (v.w.), 1430 (s.), 1383 (m.), 1255 (s.), 1116 (s.), 998 (v.w.), 818 (s.), 802 (s.), 787 (s.), 767 (m.), 739 (s.), 712 (m.), 698 (s.), 678 (w.), 660 (m.) cm.$^{-1}$.

That which is claimed is:

1. A silane having two or three bromomethyl substituents and one or two aryl substituents, any other substituent being selected from the group consisting of hydrocarbon and halogenated hydrocarbon radicals.

2. $CH_3(C_6H_5)Si(CH_2Br)_2$.

3. A method for the preparation of bromomethylsilanes containing one, two or three bromomethyl substituents, one or two aryl substituents, any other substituent being a hydrocarbon radical, halogenated hydrocarbon radical or unreacted alkoxymethyl or aryloxymethyl groups, which comprises reacting a silane having two or three alkoxymethyl or aryloxymethyl groups and one or two aryl substituents, any other substituent being selected from the group consisting of hydrocarbon, and halogenated hydrocarbon radicals with a triarylphosphine dibromide $Q_3PBr_2$ wherein each Q is an aryl group.

4. A method according to claim 3 wherein each aryl is a phenyl group.

5. A method according to claim 3 wherein each alkoxymethyl is a methoxymethyl group.

6. A method according to claim 3 which comprises adding bromine to a solution of triorganophosphine in an inert solvent, adding an alkoxymethylsilane having two or three alkoxymethyl or aryloxymethyl groups and one or two aryl groups, any other substituent being a hydrocarbon or halogenated hydrocarbon radical, to the solution, heating the solution under reflux for a period sufficient to form the corresponding bromomethylsilane having two or three bromomethyl substituents, one or two aryl substituents and any other substituent being a hydrocarbon or halogenated hydrocarbon radical, and recovering the bromomethylsilane from the solution.

References Cited

UNITED STATES PATENTS

| | | |
|---|---|---|
| 2,640,064 | 5/1953 | Speier. |
| 3,449,393 | 6/1969 | Sattlegger et al. |

OTHER REFERENCES

Fieser et al.: "Organic Chemistry," 3rd ed., Reinhold Publ. Corp., N.Y. (1956), p. 137.

Canavan et al.: "C.A.," 54, 1959, p. 8682i.

Day et al.: "Organic Chemistry," D. Van Nostrand Co., Inc., Princeton (1960), pp. 294–295.

Wiley et al.: "J.A.C.S.," 86, Mar. 5, 1964, pp. 964–965.

TOBIAS E. LEVOW, Primary Examiner

P. F. SHAVER, Assistant Examiner

U.S. Cl. X.R.

260—46.5, 999